US010736048B2

(12) United States Patent
Tang et al.

(10) Patent No.: US 10,736,048 B2
(45) Date of Patent: *Aug. 4, 2020

(54) ADJUSTING POWER OF A CONTROL CHANNEL BASED ON A CHARACTERISTIC OF A MESSAGE IN THE CONTROL CHANNEL

(71) Applicant: Apple Inc., Cupertino, CA (US)

(72) Inventors: Yuqiang Tang, Plano, TX (US); Mark A. Harris, Plano, TX (US)

(73) Assignee: Apple Inc., Cupertino, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/144,001

(22) Filed: Sep. 27, 2018

(65) Prior Publication Data

US 2019/0028977 A1    Jan. 24, 2019

Related U.S. Application Data

(63) Continuation of application No. 13/963,026, filed on Aug. 9, 2013, now Pat. No. 10,091,739, which is a continuation of application No. 13/957,607, filed on Aug. 2, 2013, now abandoned, which is a continuation of application No. 13/539,594, filed on Jul. 2, 2012, now Pat. No. 8,504,093, which is a continuation of application No. 10/389,473, filed on Mar. 14, 2003, now Pat. No. 8,238,956.

(51) Int. Cl.
*H04W 52/18* (2009.01)
*H04W 52/32* (2009.01)

(52) U.S. Cl.
CPC ......... *H04W 52/18* (2013.01); *H04W 52/322* (2013.01); *H04W 52/325* (2013.01)

(58) Field of Classification Search
None
See application file for complete search history.

(56) References Cited

U.S. PATENT DOCUMENTS

| 5,806,003 | A  | 9/1998  | Jolma et al. |
| 6,137,840 | A  | 10/2000 | Tiedemann, Jr. et al. |
| 6,269,257 | B1 | 7/2001  | Cannon et al. |
| 6,650,873 | B2 | 11/2003 | Chen et al. |
| 6,657,976 | B1 | 12/2003 | Larghi |
| 6,687,285 | B1 | 2/2004  | Jou |
| 6,711,416 | B1 | 3/2004  | Zhang |
| 6,757,537 | B1 | 6/2004  | Choi et al. |
| 2003/0060224 | A1 | 3/2003 | Nelson et al. |
| 2003/0218993 | A1 | 11/2003 | Moon et al. |
| 2004/0005905 | A1 | 1/2004 | Petrus et al. |
| 2004/0142715 | A1 | 7/2004 | Oses |

OTHER PUBLICATIONS

3rd Generation Partnership Project 2 Medium Access Control (MAC) Standard for cdma2000 Spread Spectrum Systems Release A, pp. 1-59 (Jun. 9, 2000).

*Primary Examiner* — Jason E Mattis
*Assistant Examiner* — Hong Shao
(74) *Attorney, Agent, or Firm* — Kowert, Hood, Munyon, Rankin & Goetzel, P.C.

(57) ABSTRACT

An entity, such as a base station, in a wireless communications network performs power control of a control channel based on one or more characteristics of a message in the control channel. For example, the control channel can be a paging channel. The one or more characteristics include, as examples, the size and/or the type of message in the control channel.

20 Claims, 3 Drawing Sheets

ADJUSTING POWER OF A CONTROL CHANNEL BASED ON A CHARACTERISTIC OF A MESSAGE IN THE CONTROL CHANNEL

PRIORITY CLAIM

This application is a continuation of U.S. patent application Ser. No. 13/963,026, filed on Aug. 9, 2013, which is a continuation of U.S. Ser. No. 13/957,607, filed Aug. 2, 2013, which is a continuation of U.S. Ser. No. 13/539,594, filed Jul. 2, 2012, now U.S. Pat. No. 8,504,093, which is a continuation of U.S. patent application Ser. No. 10/389,473, filed Mar. 14, 2003, now U.S. Pat. No. 8,238,956, all of which are hereby incorporated by reference in their entirety as if fully and completely set forth herein.

TECHNICAL FIELD

This invention relates generally to adjusting the power of a control channel based on one or more characteristics of a control message to be communicated over an air interface.

BACKGROUND

Mobile communications systems are made up of a plurality of cells. Each cell provides a radio communication center in which a mobile station establishes a call with another mobile station or a wireline unit connected to a public switched telephone network (PSTN) or a packet data network. Each cell typically includes a radio base station, with each base station connected to a mobile switching center for processing circuit-switched calls, or to a packet data serving node for processing packet-switched communications.

Various wireless protocols exist for defining communications in a wireless network. One such protocol is the time-division multiple access (TDMA) standard, According to IDMA, each radio frequency (RF) carrier carries a frame that is divided into plural time slots to increase the number of mobile stations that can be supported per RF carrier. Examples of TDMA wireless networks include IS-136 and GSM (Global System for Mobile) wireless networks.

Another type of wireless technology is provided by the code-division multiple access (CDMA) standard. CDMA is a spread spectrum wireless communications protocol in which transmission is based on the spread spectrum modulation technique to allow many users to have access to the same band of carriers.

Traditionally, wireless networks have been designed for carrying circuit-switched voice traffic. However, with the explosion of the Internet and intranets, packet-switched communications (e.g., web browsing, electronic mail, and so forth) have become common. As a result, third generation (3G) and beyond wireless technologies have been developed to transition to higher bandwidth and more efficient packet-switched communications over wireless networks.

One example of a 3G wireless technology is the CDMA 2000 technology, as defined by the IS-2000 Standard. A CDMA 2000 wireless communications system is capable of supporting both traditional voice traffic (circuit-switched voice traffic) as well as packet-switched traffic, such as web browsing, electronic mail, voice-over-IP (Internet Protocol), and so forth. Other types of 3G wireless technologies have also been implemented, such as the 1xEV-DO, 1xEV-DV, UMTS (Universal Mobile Telecommunication System), and Enhanced GPRS (General Packet Radio Service) technologies, among others.

In conventional wireless systems, control and traffic channels are defined for carrying control and traffic data, respectively. To establish a call, control signaling is initially exchanged between a mobile station and a base station. For example, in a CDMA wireless network, a mobile station can originate a call by sending an origination message on an access channel to a base station. The base station in turn assigns various network resources to the mobile station by sending an assignment message to the mobile station over a paging channel. For a mobile station-terminated call (in which the call is originated by another endpoint and targeted to the mobile station), the base station pages the mobile station on the paging channel.

Typically, certain control channels, such as the paging channel, are communicated at a fixed power level. The fixed power level of the paging channel is selected to achieve a compromise between reliability of communication of control messages and available bandwidth or capacity within a given cell. The higher the power level of the paging channel, the lower the bandwidth or capacity available in a given cell. On the other hand, reducing the power level of a paging channel increases the likelihood of errors occurring in the communication of control messages between the base station and the mobile station, which reduces reliability of wireless communications.

Therefore, in conventional wireless communications networks, because the paging channel is transmitted at a fixed power level, performance within a cell may not be optimized.

SUMMARY

In general, methods and apparatus are provided to dynamically adjust the power level of a control channel for communicating control messages to enhance flexibility and performance. For example, a method of wireless communications in a mobile communications network includes determining at least one characteristic of a message to be communicated in a control channel, and adjusting a power level of the control channel based on the determined at least one characteristic of the message.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
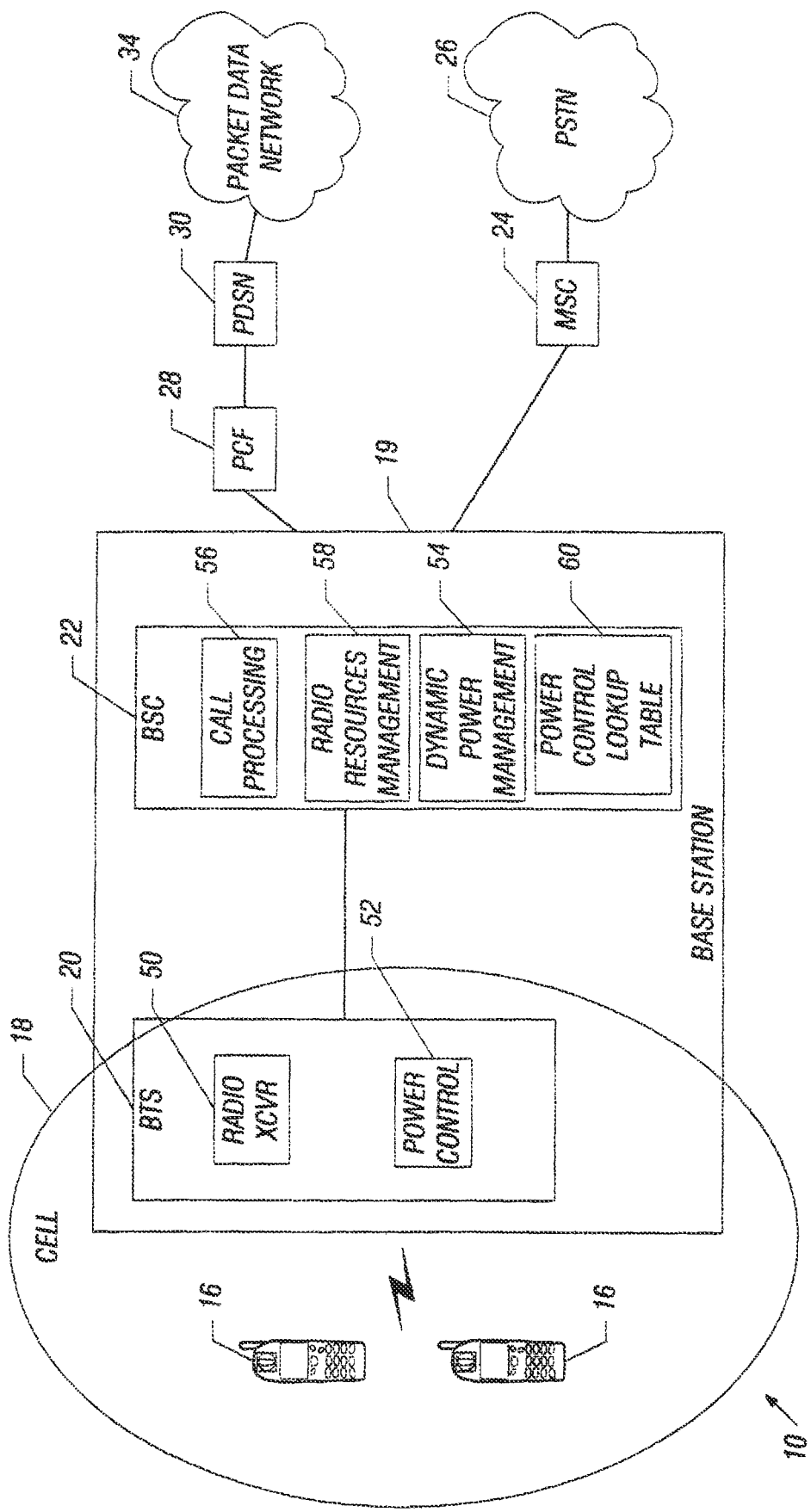
FIG. 1 is a block diagram of an example wireless communications network.

Referring to FIG. 1, a wireless communications network 10 according to one example arrangement includes components that operate in accordance with the CDMA (code-division multiple access) 2000 family of standards (collectively referred to as the IS-2000 Standard), which has been developed by the Third Generation Partnership Project 2 (3GPP2). However, in other embodiments, other types of wireless protocols can be used for communications in the wireless communications network 10, including other versions of CDMA (e.g., IS-95, 1×EV-DO, 1×EV-DV), TDMA protocols (e.g., IS-136, GSM), UMTS (Universal Mobile Telecommunication System) protocols, Enhanced General Packet Radio Service (EGPRS) protocols, and so forth.

The wireless communications network 10 includes multiple cells 18 (only one shown in FIG. 1). The cell 18 includes a base transceiver subsystem (BTS) 20 for performing radio communications with mobile stations 16 within the coverage area of the cell 18. The BTS 20 is connected to a base station controller (BSC) 22. Collectively, the BTS 20 and BSC 22 are logically referred to as a "base station" 19, indicated by the broken line in FIG. 1, with the understanding that multiple BTSs 20 can, and typically do, share one BSC 22. The role of the BSC is to manage resource allocation amongst the BTSs to which the BSC is connected. Such resources include power control, channel management, and frequency management, between a given BTS and mobile terminals in communication with the BTS. More generally, the terms "base station" and "access network" refer to any entity (or collection of entities) that communicates wirelessly with mobile stations for communications sessions (e.g., circuit-switched call sessions, packet-switched voice call sessions, other packet-switched communications session, and so forth).

For communicating circuit-switched voice traffic, the BSC 22 is coupled to, and often is co-located with, a mobile switching center (MSC) 24, which is responsible for switching mobile station-originated or terminated traffic. Effectively, the MSC 24 is the interface for control signaling and user traffic between the wireless network 10 and other switched networks (such as a public switched telephone network (PSTN) 26) or other MSCs.

The wireless communications network 10 according to the example also supports packet data services, in which packet data is communicated between a mobile station 16 and another endpoint, which can be a terminal coupled to a packet data network 34 or another mobile station that is capable of communicating packet data. Examples of the packet data network 34 include private networks (such as local area networks or wide area networks) and public networks (such as the Internet). Packet data is communicated in a packet-switched communications session established between the mobile station 16 and another endpoint.

To communicate packet data, the BSC 22 is coupled to a packet control function (PCF) module 32, which manages the relay of packets between the BSC 22 and a packet data serving node (PDSN) 30. The BSC 22 and PCF module 32 can be implemented on one platform or on multiple platforms.

In accordance with some embodiments, the base station 19 is able to dynamically adjust the power level of a paging channel from the base station 19 to a mobile station 16. Although reference is made to the adjustment of the power level of a paging channel, similar power control can also be performed for other control channels. To improve flexibility and performance within a cell 18 (or cell sector), the power level of the paging channel is adjusted by the base station 19 based on one or more characteristics of a control message in the paging channel, such as the type and/or size of the control message.

As used here, adjusting the power level or power of a control channel refers to adjusting the power of signaling (e.g., RF signaling) used to carry the control channel. For example, the power of the signaling can be increased by increasing the gain or amplification of the baseband signal that carries the bit stream making up the information to be transmitted from the base station to the mobile station.

As the size of a control message increases, more frames are needed to carry the control message. As the number of frames increases, the likelihood of encountering error also increases. To counteract this, the power level of the paging channel (or other control channel) can be increased to reduce the error rate. Thus, in accordance with some embodiments, as the size of a control message in the paging channel increases, the power level of the paging channel is also increased.

Since increasing the power level of the paging channel comes at the expense of reduced bandwidth or capacity, it may not be desirable to adjust the power level of the paging channel for certain types of messages. For example, some messages are sent periodically by the base station, such as system parameter messages. Because of the repeated transmission of these messages, errors in the reception of system parameter messages are usually not fatal. On the other hand, if a channel assignment message (for assigning wireless network resources during call setup) is not received successfully by a mobile station, then call establishment cannot proceed, which leads to call establishment failure. Therefore, it is desirable to enhance the reliability of transmission of the channel assignment message in the paging channel. The size of the channel assignment message can vary.

As further shown in FIG. 1, the BTS 20 includes a radio transceiver 50 for communicating RF signaling between the base station 19 and the mobile stations 16. The BTS 20 also includes a power control module 52 that sets the power level of signaling communicated from the radio transceiver 50 to the mobile stations 16.

According to one embodiment, the power level set by the power control module 52 is controlled by a dynamic power management module 54 in the BSC 22. For each control message communicated over the paging channel from the base station 19 to a mobile station 16, the dynamic power management module 54 determines what power level to set based on the type of control message and/or the size of the control message. In an alternative embodiment, the power control task performed by the dynamic power management module 54 can be performed by the power control module 52 in the BTS 20.

The BSC 22 also includes other modules, including a call processing module 56 that interacts with either the MSC 24 or the PDSN 30 for establishing a call session. A "call session" refers to either a circuit-switched call session or a packet-switched communications session (for communicating real-time data such as voice data or conventional packet data such as web browsing data, electronic mail data, and so forth). Also included in the BSC 22 is a radio resources management module 58 that controls assignment of radio resources for a particular call that involves a mobile station 16 in the cell 18. For example, the radio resources assigned include traffic channels and other radio resources.

Figure 2:
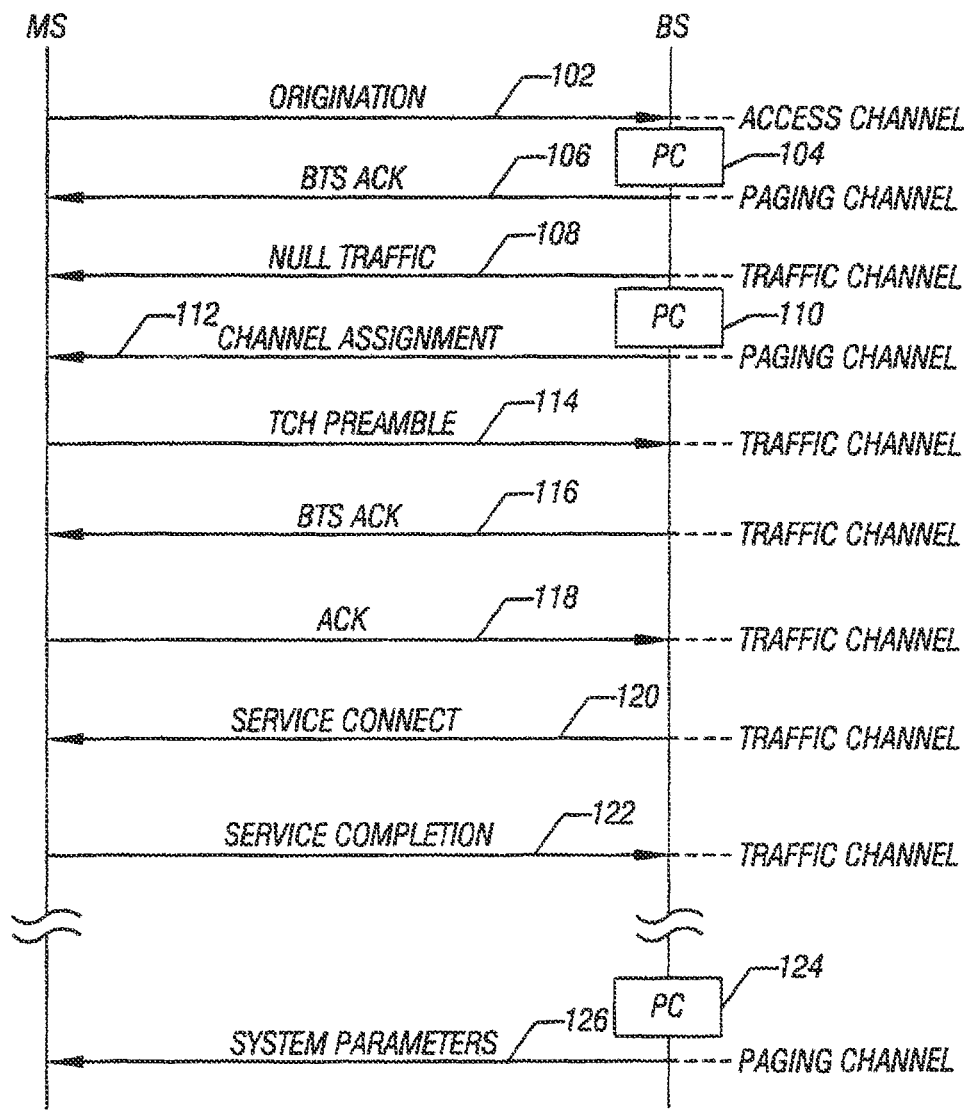
FIG. 2 is a message flow diagram for establishing a call in the wireless communications network of FIG. 1.

Referring to FIG. 2, an example of a call flow is illustrated in which power control according to some embodiments is performed. FIG. 2 illustrates a call that is originated by a mobile station. To originate a call, the mobile station transmits an origination message (at 102) to the base station over an access channel to request service. The base station acknowledges the receipt of the origination message with a base station acknowledgement (BTS ACK) message (at 106) over the paging channel. However, prior to transmitting the BTS ACK message on the paging channel, the base station first performs (at 104) power control to set the power level of the paging channel.

Following transmission of the BTS ACK message on the paging channel, the MSC 24 interacts with the BSC 22 (and optionally the PDSN 30) to determine whether service is to be provided to the requesting mobile station, such as to determine whether traffic channels and other resources are available to be allocated to the mobile station. If service is to be provided, the base station transmits null traffic (at 108) on the forward traffic channel to the mobile station. The base station also prepares to communicate the allocated resources to the mobile station via the channel assignment message (at 112) on the paging channel. Prior to sending the channel assignment message, the base station performs (at 110) power control to set the power level of the paging channel on which the channel assignment message is to be communicated.

The channel assignment message defined by CDMA 2000 has an ASSIGN_MODE field that can be set to one of several values. Each value of ASSIGN_MODE is associated with a specific combination of fields to be included in the channel assignment message. As a result, different values of ASSIGN_MODE will cause the channel assignment message to vary in length. CDMA 2000 also defines an extended channel assignment message, which has added fields and thus is generally larger in size than the basic channel assignment message. As used here, a "channel assignment message" refers to either the basic channel assignment message or the extended channel assignment message. In other types of networks, other types of control messages for assigning network resources are communicated by a base station over control channels to mobile stations.

Once the forward traffic channel is established, the mobile station sends (at 114) a traffic channel preamble (TCH Preamble) shortly followed by null traffic data over the assigned reverse traffic channel. When the base station receives the TCH Preamble over the reverse traffic channel, it sends the base station acknowledge (BTS ACK) message (at 116) on the forward traffic channel back to the mobile station. The mobile station then acknowledges the reception of the BTS ACK message by sending an acknowledge (ACK) message (at 118) to the base station over the reverse traffic channel.

At this point, the base station sends a service connect message (at 120) over the forward traffic channel to the mobile station to specify the service configuration for the call session. The mobile station processes traffic in accordance with the specified service configuration. On receipt of the service connect message, the mobile station responds (at 122) with a service connect completion message on the reverse traffic channel. After further exchange of other control messaging, a call session is established between the mobile station and base station in which data of voice traffic (or other traffic) can be communicated over the traffic channels.

Also, periodically, the base station may send (at 126) control messages containing system parameters to mobile stations over the paging channel. Prior to sending the messages containing the system parameters, the base station performs (at 124) power control to determine what power level to set the paging channel.

Figure 3:
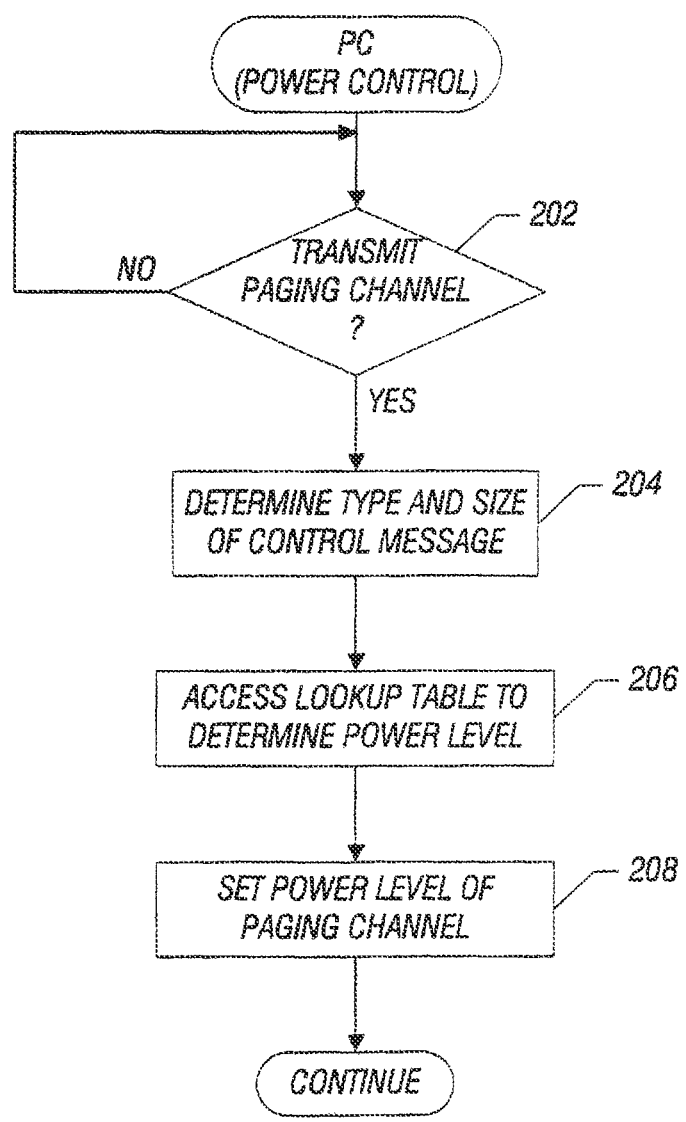
FIG. 3 is a flow diagram of a process of performing power control that is part of establishing the call of FIG. 2.

FIG. 3 shows an embodiment of performing power control (104, 110, 124) in accordance with an embodiment. The process of FIG. 3 can be performed by the dynamic power management module 54 (FIG. 1) in the BSC 22, or alternatively, the process can be performed by the power control module 52 in the BTS 20. More, generally, the task shown in FIG. 3 is performed by a "module" that is located in the base station 19. The module first determines (at 202) whether a message is to be transmitted over the paging channel by the base station 19. If so, the module determines (at 204) the type and size of the control message.

As discussed in connection with FIG. 2, examples of messages that can be communicated over the paging channel include the BTS ACK message, a channel assignment message, general page message and a system parameters message. These are four different types of control messages that can be communicated over the paging channel. Other control messages can also be communicated over the paging channel. Also, certain control messages can vary in size (such as the channel assignment message) depending upon the fields that are inserted into these messages.

Based on the type and size of the control message, the module accesses (at 206) a lookup table 60 (FIG. 1) to determine what power level to assign the paging channel. The lookup table 60 essentially is a table that relates message types and sizes to power levels.

In the example message flow of FIG. 2, the channel assignment message is assigned a higher power level because of its size and its relative importance. The relatively large size of the channel assignment message means that errors are more likely. An error in the channel assignment message will usually cause call establishment to fail. On the other hand, the BTS ACK message sent on the paging channel is typically smaller than the channel assignment, so that a lower power level (e.g., default power level) can be assigned to transmit the BTS ACK message over the paging channel. The system parameters message is sent periodically over the paging channel. Thus, an error in one transmission is usually not fatal, as the mobile station will receive another system parameters message shortly. As a result, a system parameters message can also be transmitted with the paging channel at a lower power level (e.g., a default power level).

The size of the channel assignment message can vary depending on the number of fields it is carrying. The module therefore also varies the power level of the paging channel based on the variation in size of the channel assignment message.

The power level for the size and type of the control message is retrieved from the lookup table 60 and the power level is set (at 208) by the module. Alternatively, instead of using the lookup table 60, the module computes the power level using a predefined algorithm based on the type and size of the message. If the module is located in the BSC 22, the setting of the power level involves the BSC 22 communicating the power level (in a parameter) to the BTS 20. However, if the module is located in the BTS 20, then the power control module 52 sets the power level by providing an indication to the radio transceiver 50.

By varying the power level of a control channel such as the paging channel depending on a characteristic (e.g., size and/or type), wireless communications performance in a cell can be optimized. The more important (and larger) control messages can be communicated with a higher power setting for the control channel, whereas smaller or less important control messages are communicated with a lower power setting for the control channel. By varying the power level of a control channel such as the paging channel, an effective compromise between reliability and capacity can be achieved in a cell.

Instructions of the various software routines or modules discussed herein (such as the module for performing power control in the base station) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage units, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the device or system and executed as corresponding software modules or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for performing wireless communications in a mobile communications network, comprising:
   a communication device determining a type of a message comprising one or more fields to be communicated in a control channel;
   the communication device determining a power level for transmission of the message using the control channel, wherein a first power level used for an acknowledgement message is based on a default power level, wherein said determining the power level for the message comprises determining a second power level based on the one or more fields of the message, wherein the one or more fields of the message are different from an acknowledgement message, wherein the second power level is based on a power level that is higher than the default power level;
   the communication device setting the power level for transmission of the message based on said determining; and
   after setting the power level for transmission, the communication device transmitting the message in the control channel using the determined power level.

2. The method of claim 1, wherein said determining the power level is also based on the size of the message.

3. The method of claim 2, wherein said determining the power level comprises using a higher power level for larger messages and using a lower power level for smaller messages.

4. The method of claim 1, wherein said determining the power level comprises using a higher power level for higher priority messages and using a lower power level for lower priority messages.

5. The method of claim 1, wherein the control channel comprises a paging channel.

6. The method of claim 1, wherein the communication device comprises a base station.

7. The method of claim 1, wherein the mobile communications network comprises one of an IS-95, CDMA (code-division multiple access) 2000, 1xEV-DO, 1xEV-DV, UMTS (Universal Mobile Telecommunication System), and EGPRS (Enhanced General Packet Radio Service) system.

8. A communication device for performing wireless communicating, comprising:
   communication circuitry for performing the wireless communication;
   processing hardware coupled to the communication circuitry, wherein the processing hardware is configured to operate with the communication circuitry to:
     determine a type of a message comprising one or more fields to be communicated in a control channel;
     determine a power level for transmission of the message using the control channel, wherein a first power level used for an acknowledgement message is based on a default power level, wherein said determining the power level for the message comprises determining a second power level based on the one or more fields of the message, wherein the one or more fields of the message are different from an acknowledgement message, wherein the second power level is based on a power level that is higher than the default power level;
     set the power level for transmission of the message based on said determining; and
     after setting the power level for transmission, transmit the message in the control channel using the determined power level.

9. The communication device of claim 8, wherein determining the power level is also based on the size of the message.

10. The communication device of claim 9, wherein determining the power level comprises using a higher power level for larger messages and using a lower power level for smaller messages.

11. The communication device of claim 8, wherein determining the power level comprises using a higher power level for higher priority messages and using a lower power level for lower priority messages.

12. The communication device of claim 8, wherein the control channel comprises a paging channel.

13. The communication device of claim 8, wherein the communication device comprises a base station.

14. The communication device of claim 8, wherein the wireless communication is performed using one of an IS-95, CDMA (code-division multiple access) 2000, 1xEV-DO, 1xEV-DV, UMTS (Universal Mobile Telecommunication System), and EGPRS (Enhanced General Packet Radio Service) system.

15. A non-transitory, computer accessible memory medium storing program instructions for performing wireless communications in a mobile communications network, wherein the program instructions are executable by a processor of a communication device to:
  determine a type of a message comprising one or more fields to be communicated in a control channel;
  determine a power level for transmission of the message using the control channel, wherein a first power level used for an acknowledgement message is based on a default power level, wherein said determining the power level for the message comprises determining a second power level based on the one or more fields of the message, wherein the one or more fields of the message are different from an acknowledgement message, wherein the second power level is based on a power level that is higher than the default power level;
  set the power level for transmission of the message based on said determining; and
  after setting the power level for transmission, transmit the message in the control channel using the determined power level.

16. The non-transitory, computer accessible memory medium of claim 15, wherein determining the power level is also based on the size of the message.

17. The non-transitory, computer accessible memory medium of claim 16, wherein determining the power level comprises using a higher power level for larger messages and using a lower power level for smaller messages.

18. The non-transitory, computer accessible memory medium of claim 15, wherein determining the power level comprises using a higher power level for higher priority messages and using a lower power level for lower priority messages.

19. The non-transitory, computer accessible memory medium of claim 15, wherein the control channel comprises a paging channel.

20. The non-transitory, computer accessible memory medium of claim 15, wherein the communication device comprises a base station.

\* \* \* \* \*